G. J. FANNER.
TIRE AND RIM LOCK.
APPLICATION FILED DEC. 16, 1909.
964,152.
Patented July 12, 1910.
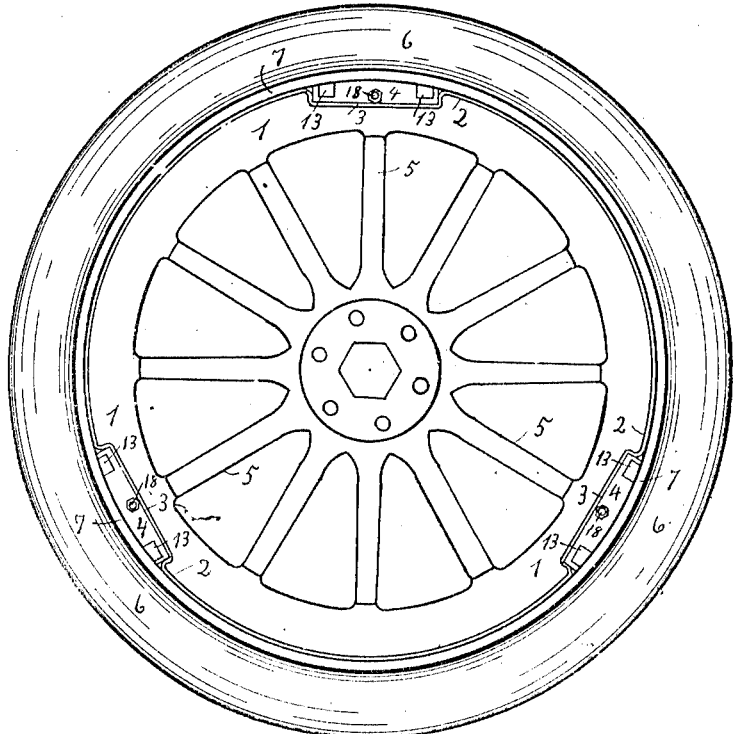
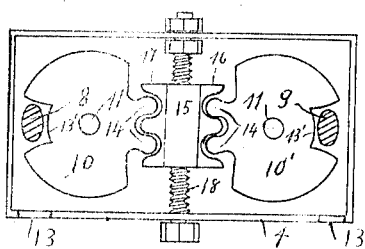
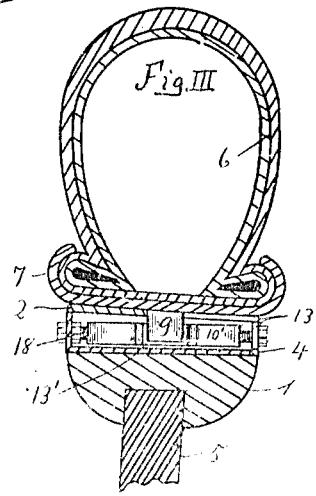
WITNESSES
John J. Donnelly
INVENTOR
George J. Fanner
by
W. E. Donnelly
his Atty

UNITED STATES PATENT OFFICE.

GEORGE J. FANNER, OF CLEVELAND, OHIO, ASSIGNOR TO THE FANNER MFG. COMPANY, OF CLEVELAND, OHIO, A CORPORATION OF OHIO.

TIRE AND RIM LOCK.

964,152.  Specification of Letters Patent.  Patented July 12, 1910.

Application filed December 16, 1909. Serial No. 533,456.

*To all whom it may concern:*

Be it known that I, GEORGE J. FANNER, a citizen of the United States, residing at Cleveland, in the county of Cuyahoga and State of Ohio, have invented some certain new and useful Improvements in Tire and Rim Locks; and I do hereby declare the following to be a full, clear, and exact description of the invention, such as will enable others skilled in the art to which it pertains to make and use the same.

This invention relates to detachable tires and rims for wheels and has for its object to provide a simple, strong and convenient setting and locking device adapted to be located in the felly of the wheel and to engage the rim so that the rim with its tire can be quickly, easily, forcibly and positively placed and locked in place upon the felly or removed therefrom.

My invention consists in the features of construction and combination of parts as will be hereinafter fully set forth and claimed.

In the drawings Figure I, illustrates a wheel known as the "artillery wheel" with pneumatic tire illustrating this invention as applied thereto showing the preferred location of the setter and lock in relation to the circumference of the felly of the wheel. Fig. II, illustrates in plan view a rim lock and setter constructed according to my invention showing the same with top removed and the position of the parts after the rim has been set and locked in position on the felly of the wheel. Fig. III, is a cross sectional view taken through a wheel felly, rim and tire, and also through the lock and setter showing the position of the parts when the rim and tire are set and locked and illustrating the incline structure of the felly and felly band.

In the drawings, 1, represents a wheel felly which in the illustration is shown as being of the artillery construction and hence of wood and being incased or surrounded by a band of metal 2, say about three sixteenths of an inch thick and the width of the felly. The felly with its band 2, is so constructed as to incline from the outside of the wheel flaring inward, and the band 2 is made so as to form pockets 3, in the felly 1, for the reception of the setters and locks 4, 4, 4, which are shown arranged and secured equidistant apart around the felly and contiguous to its periphery. In the case illustrated three are shown and are located preferably opposite the spokes 5, 5, 5, for convenience in construction.

6, represents a pneumatic tire which may be of any type and held on a rim 7, to which it is secured. The tire 6 is readily detachable from the rim 7 and one or more inflated tires may be carried on a vehicle or in stock for quick service in case of a puncture or blow out of a tire. The rim 7, is provided with spuds 8, 9, located on its inner periphery and located preferably central of its width; the respective pairs of pins 8, 9, being also arranged to conform with the number of setters or locks 4, 4, 4, in the case shown three sets are employed. The rim 7 is also made inclined or tapering to conform with the felly periphery so that when the rim and tire are set and locked the contact of the parts is firm and strong. The incline of the felly and rim also allow of the rim and tire being easily "started" on the felly when the setter and lock acts to draw, set and lock the parts in position quickly and firmly.

The setter and lock is formed and operated as follows: 10, 10′, represent two rotatable or oscillating locks or members which are pivotally secured as at 11, 11, preferably in a casing or box 4. The outer edges of the peripheries of the locks or members 10, 10′, are formed with open slots 13′, 13′, of sufficient area to receive the pins or spuds 8, 9, which are preferably formed of oblong shapes in cross section so that they will engage in the slots 13′, more firmly and can be disengaged therefrom more fully. The opposite edge of each lock 10, 10′, is provided with a series of teeth 14, which engage in a sliding nut 15, provided with racks 16, 17, on either side of the nut 15, and movable therewith. The nut 15 is so mounted that as it slides in either direction the lock members 10, 10′, are moved thus partially rotating the lock members and drawing the pins 8, 9, with the rim 7, in or out of engagement or locked position on the felly of the wheel. In order to operate the nut I have shown a screw 18, mounted so as to engage and operate the nut 15 which is done by a suitable wrench and thus in removing the tire and its attached rim it can be started off easily.

In illustrating and setting forth this invention I have shown and described mechanical structure and certain types, but it is apparent that the same may be modified and changed and still the essence of this invention be embodied in the same.

What I claim is:

1. In a vehicle wheel, a detachable rim, means for movably securing said rim to the felly of said wheel, said means comprising a toothed rack mounted on said felly and pivoted members adapted to be engaged by said toothed rack and to engage said rim.

2. In a vehicle wheel, a detachable rim, means for forcing said rim off and on the felly of said wheel comprising toothed members pivoted to said felly and in engagement with said rim, a screw threaded member working between said pivoted members, and a toothed member carried by said screw threaded member adapted to engage and rock said pivoted members.

3. In a rim lock for vehicle wheels, the combination with a detachable rim, means for forcing said rim on or off the felly of said wheel comprising toothed members pivotally mounted on said felly, said pivotally mounted members being provided with oppositely disposed peripheral recessed portions and toothed portions, a screw threaded member, a nut working on said screw threaded member, said nut having oppositely disposed toothed portions in engagement with the toothed portions of said pivoted members, and depending lugs on said rim adapted to be engaged by said recessed portions of said pivotal members.

Signed at Cleveland in the county of Cuyahoga and State of Ohio, this 11th day of November, 1909.

GEORGE J. FANNER.

Witnesses:
 JOHN J. DONNELLY,
 A. B. DONNELLY.